United States Patent

[11] 3,601,958

[72] Inventor Earl O. Roof
 1228 N. Walnut St., Pontiac, Ill. 61764
[21] Appl. No. 754,682
[22] Filed Aug. 22, 1968
[45] Patented Aug. 31, 1971

[54] SELF-PROPELLED ROTARY MOWER
 8 Claims, 5 Drawing Figs.
[52] U.S. Cl. .................................................. 56/13.7,
  56/6, 56/14.9
[51] Int. Cl. ....................................................... A61d 35/26
[50] Field of Search ............................................ 56/25.4, 6,
  295; 280/53 FE

[56] References Cited
UNITED STATES PATENTS

| | | | |
|---|---|---|---|
| 3,063,226 | 11/1962 | Pfauser | 56/25.4 |
| 3,433,003 | 3/1969 | Musgrove | 56/26 |
| 3,512,344 | 5/1970 | Kortum | 56/25.4 |
| 1,482,880 | 2/1924 | Barton | 180/53 FE |
| 2,801,510 | 8/1957 | Colburn | 56/25.4 |
| 2,862,343 | 12/1958 | Wood | 56/25.4 |
| 2,901,257 | 8/1959 | Teagle | 56/25.4 X |
| 2,940,241 | 6/1960 | Stahl | 56/25.4 |
| 3,077,065 | 2/1963 | Samways et al. | 56/25.4 |
| 3,136,106 | 6/1964 | Joslin | 56/25.4 |
| 3,118,266 | 1/1964 | Colburn | 56/25.4 |
| 3,255,577 | 6/1966 | Colburn | 56/25.4 |

Primary Examiner—Louis G. Mancene
Assistant Examiner—J. N. Eskovitz
Attorney—Dawson, Tilton, Fallon & Lungmus ABSTRACT: A rotary mowing or cutting unit is suspended beneath the central portion of a jeep-style traction vehicle which has a low center of gravity and is capable of speeds up to 14 miles per hour. Three cutting blades are arranged within a mower deck for cutting slightly overlapping swaths in the direction of travel of the vehicle, and combining to cut an overall swath which is greater than the vehicle width. The mowing unit is provided with side runners which extend forward of the deck and rear rollers for engaging ground obstructions and limiting downward movement of the mower unit. The deck is mounted to the vehicle by a mechanism which permits an operator to adjust the height of the cutter blades while allowing the unit to be raised should it encounter an elevation in the ground. The mounting mechanism prevents the cutter unit from tilting fore and aft while allowing one side of the unit to lift if the runner on that side engages a ground elevation. A spring-biased counterbalancing system offsets most of the weight of the mowing unit to permit a fast vertical reaction at high ground speeds. The mowing unit is designed to cut the volume required at these speeds while separating out debris struck by the blades.

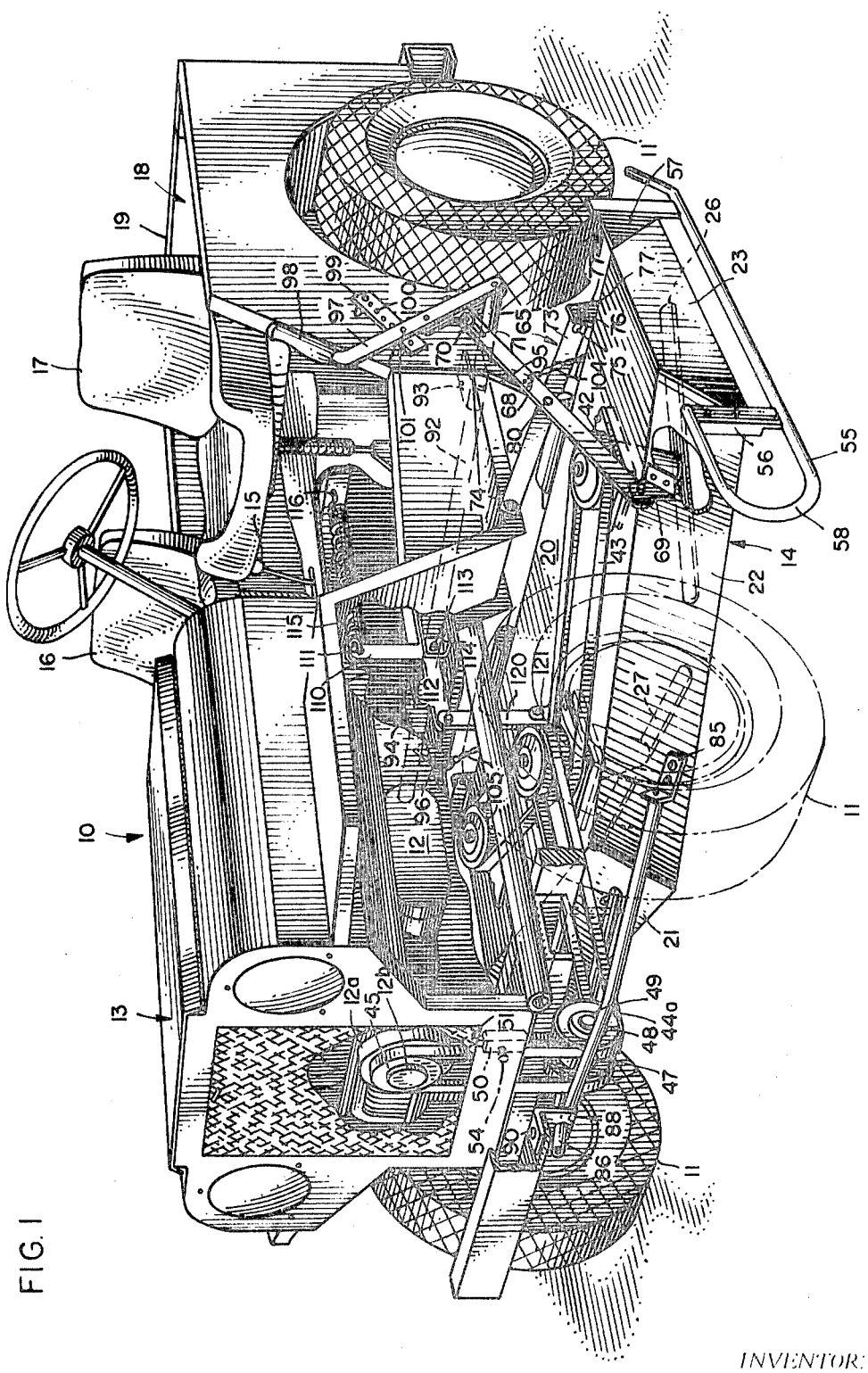

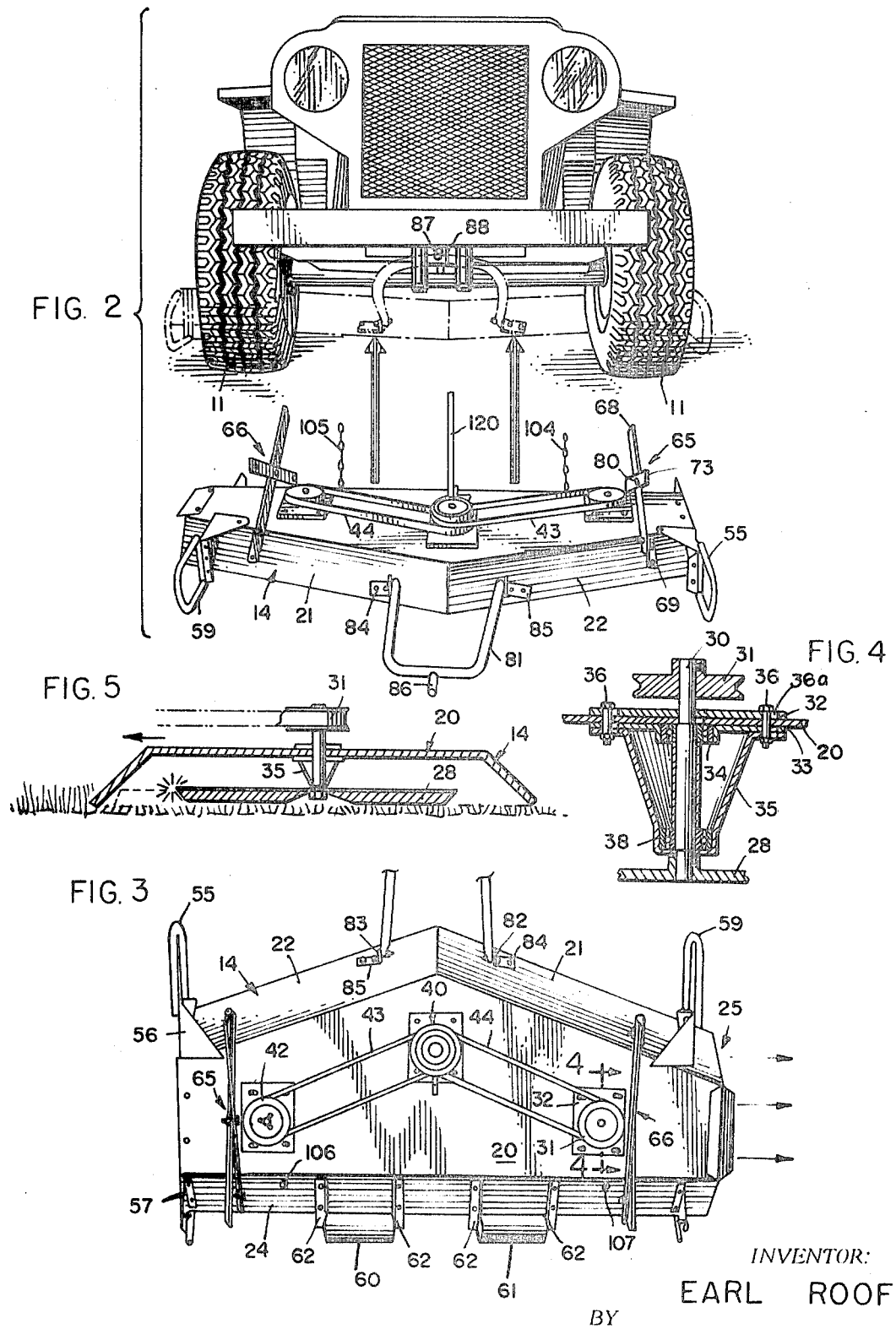

SELF-PROPELLED ROTARY MOWER

BACKGROUND

The present invention relates to self-propelled rotary mowers; more particularly, it relates to a self-propelled rotary mower capable of cutting swaths of approximately 60 inches in width and at speeds of up to 14 miles per hour.

Self-propelled rotary mowers may be classified into two general areas. One of these areas includes mower units which are detachably mounted beneath a conventional farm tractor. Farm tractors have the power requirements capable of higher speeds, but they also have a narrow front wheel base and a relatively high center of gravity, thus restricting their maneuverability and usefulness in cutting on slopes.

The other type of rotary power motor which is self-propelled is referred to as the garden mower; and although it has a low center of gravity and fairly wide wheel base, it lacks the power and mowing capacity capable of achieving mowing speeds any higher than 3–4 miles per hour. Further, in the normal garden-type of self-propelled rotary mower, the frame of the vehicle is normally so low that there is no provision for a substantial adjustment of the height of the cutting blades as required to cut both grass and high weeds.

The present invention combines the low cost and maneuverability of garden mowers with the higher power and speeds of the tractor-type mowers while permitting substantial adjustment of the mowing or cutting unit to achieve cutting of both lawns and high weeds at these heretofore unknown mowing speeds.

Thus, the present invention is capable of mowing speeds of up to 14 miles per hour and although it cuts a narrower swath than the more expensive and much more powerful tractor-type mower pulling reel or rotary cutters, it can accomplish the same cutting volume in a given time while providing a much less expensive unit having a broader range of utility.

The mowing unit is suspended beneath the center portion of a jeep-type traction vehicle which has a relatively low center of gravity and a wide wheel base. Thus, the vehicle is capable of cutting on hill slopes which would prohibit the use of a tractor with its high center of gravity yet which permits the adjustment of the height of the cutter blades over a substantial range, as desired. The mowing unit may be detached from the traction vehicle to permit the latter's use as a general purpose utility vehicle.

The vehicle is equipped with an 18 horsepower engine and a hydrostatic transmission; and a belt couples to engine power to drive the cutter blade at a constant speed. The hydrostatic transmission couples the engine power to the rear drive wheels of the vehicle and permits a continuously variable range of forward and reverse speeds for the vehicle while the cutter blades are driven at maximum speed as determined by the engine speed.

Three cutting blades are supported by a mowing deck and arranged in a generally triangular pattern so that the center and lead blade cuts a swath which slightly overlaps the swaths cut by the side blades.

The mower deck is mounted beneath and centrally of the vehicle so that it may be adjusted to various heights above the ground; and it is provided with a pair of side runners projecting forwardly of the mower deck to define a minimum height below which the cutter blades cannot be lowered. The mounting system includes a scissors linkage mechanism on each side of the mower deck interconnecting it with the frame of the traction vehicle. The scissors linkages permit the raising of either side of the mowing unit in a parallel line relative to the direction of travel of the vehicle while preventing tilting in a fore and aft direction. A counterbalancing mechanism offsets the greater portion of the weight of the mowing unit; and it is connected centrally of the mower deck so that, in combination with the side scissors links if either of the side runners encounters an obstruction, the mower unit will have a fast response time and tilt about a line parallel to the direction of vehicle travel to lift the deck and cutters. The suspension system also includes a wishbone mounting link interconnecting the front, sloped band of the mower deck with a forward crossbar of the vehicle frame to maintain the proper horizontal orientation of the mowing unit beneath the traction vehicle when mowing flat terrain while resisting lateral movement of the mower deck relative to the vehicle frame. Two flexible chain links interconnect the rear portion of the mower deck with a rotatable bar extending transverse of the vehicle. A hand-actuatable lever is connected to the transverse bar; and rotation of this lever raises the mower deck by means of the flexible links. The side scissors links and the wishbone link maintain the parallel orientation of the mower unit relative to the ground so that the flexible links permit raising of the mower unit while defining a predetermined height below which it will not descend.

The vehicle is also provided with a storage section including a rear drop gate which enhances the broader utility of the vehicle; and the storage area may be used for holding major obstructions which may get in the way during the mowing operation. The mowing unit is adapted to process the greater quantity of grass or weeds encountered in the higher speeds at which the combination is designed to operate by providing that the cutting blades be of the propeller type to create an updraft and by providing a relatively large chamber between the upper surface of the mower deck and the blades so that the cut material is forced by the air current upwardly of the blades and processed through an open side of the mower deck. Other, more solid and heavier objects such as rocks and glass, if struck, are propelled toward the downwardly inclined front and back walls of the mower deck and deflected toward the ground.

With this combination, the inventive device is able to mow grass at speeds up to 12–14 miles per hour and weeds at speeds of up to 10 miles an hour without undue congestion of the cut material in the mowing unit and with a better flexibility and safety than is provided by tractors. At the same time, the mower unit may be set at any predetermined height above the ground; and yet, when the side runners encounter an obstruction, the mower unit quickly responds (due to the counterbalancing mechanism) to tilt about a line parallel to the direction of travel of the vehicle and ride over the obstruction. The entire mower unit is easily detached entirely from the vehicle, which may then be used as a general utility vehicle or even as a golf cart.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is a perspective view of a self-propelled rotary power mower according to the present invention, partially in phantom to show details of he mowing unit;

FIG. 2 is a front perspective view of the unit of FIG. 1 illustrating the detachment of the mowing unit from the traction vehicle;

FIG. 3 is a plan view of the mower unit;

FIG. 4 is a vertical cross section view of a bearing mount for a cutter blade taken through the lines 4—4 of FIG. 3; and FIG. 5 is a schematic diagram of the cutting unit in operation.

DETAILED DESCRIPTION

Turning now to FIG. 1, the traction vehicle is generally designated by reference numeral 10; and it has four ground-engaging wheels 11 (only three of which are shown) equipped with flotation tires, and an engine generally designated 12 located beneath a hood 13. The engine 12 powers a clutch 12a coupled to a drive shaft 12b which extends in front of the engine for coupling power to a mowing or cutter unit generally designated 14 and mounted centrally beneath the traction unit 10. The engine 12 also powers a main drive shaft according to known technique which couples power to the rear drive axle through a conventional hydrostatic transmission, the speed of which is controlled by means of a joy stick 15 located between two seats 16 and 17 mounted in the vehicle 10.

The seat 17, is, of course, the operator's or driver's seat; and a storage section generally designated 18 is located behind the seats 16 and 17. The storage area 18 is accessible through the opened top or through a drop gate 19. It will be observed that the seats 16 and 17 locate the riders within the vehicle and not on the vehicle as is common to the small garden-type mowers thereby offering greater safety from overhead branches and bushes. Further, the storage section 18 of the vehicle enhances its use as a general utility vehicle when the mower unit is detached, or it may be used to transport larger objects encountered during the mowing operation as they are removed from the path of the vehicle.

The traction vehicle 10 has the general shape and appearance of a jeep vehicle on a reduced scale. It is not necessary that it have four-wheel drive, although this is not excluded from the inventive concept; and preferably, the horsepower rating of the engine 12 is of the order of 18 horsepower which provides sufficient energy to drive the vehicle at a rate up to 14 miles per hour while still maintaining full cutting operation of the suspended cutter unit. The wheel base of the vehicle is 56 inches; and it has a low center of gravity in comparison with conventional farm tractors thus providing it with greater maneuverability than a farm tractor and an ability to cut weeds or grass on a slope of greater inclination than that which a farm tractor is able to negotiate. Either or both the seats 16 and 17 may be removed if greater storage area is required when the vehicle is used as a utility vehicle.

As used herein, the term "jeep-type vehicle" refers to a four-wheel traction vehicle having a front-end mounted motor and which is capable of carrying passengers within the vehicle and providing a rear storage area. It is characterized by having a relatively low center of gravity as compared with a farm tractor and a wide wheel base as compared with the front wheels of a farm tractor or a conventional small garden mower.

Turning now to the mowing unit, it includes an integral housing or deck comprising a top plate 20, first and second front plates 21 and 22 which extend downwardly and forwardly from the top plate 20 and which are inclined relative to one another to form a pilot for the cutter housing, a vertical sideplate 23, and a rear section 24 which extends downwardly and rearwardly from the top plate 20.

Referring now to FIG. 3, the front inclined plates 21 and 22 together with the sideplate 23 and the back plate 24 provide a peripheral band housing the cutter blades. The side opposite plate 23 (generally designated by reference numeral 25) is left open for exhausting the cut grass or weeds. Three cutter blades are rotatably mounted on the top plate 20 of the deck of the mowing or cutter unit; two of the blades are designated 26 and 27 and shown in phantom in FIG. 1, and the right side blade (when viewed from the standpoint of an operator seated in seat 17) is designated 28 in FIG. 4. Each of the cutter blades 26-28 is the type commonly referred to as a propeller type of cutter blade in that the cutting portions have a slight draft proceeding from the cutting edge to the trailing edge of the blade to create a vertical air current to raise the grass for cutting and to lift the cut material above the cutting blades.

All three cutter blade mountings are similar, and only one need be described in greater detail. Referring then to FIG. 4, which illustrates the mounting for the blade 28, a central shaft 30 extends through the top plate 20 and receives a pulley 31 secured to the shaft above the top plate 20. Plates 32 and 33 are mounted on either side of the top plate 20 of the deck; and the shaft 30 extends through them. The plate 33 is provided with the center bearing 34 which supports the shaft 30; and the plates 32 and 33 as well as a housing 35 of inverted conical shape and extending coaxially with the shaft 30, are secured to the top plate 20 by means of bolts 36. The bolts 36 are received in slots 32a in plate 32 and slots 33a in plate 33 in the case of the side cutter blades so that the cutter mountings may be moved back to tighten their drive belts, as described presently.

The lowermost portion of the conical housing 35 is provided with a second bearing 38 supporting the shaft 30; and the blade 28 is fastened to the bottom of the shaft 30 outside of the conical housing 35. Thus, when the pulley 31 is driven, the blade 28 rotates. Similar bearing mounts are provided for the other cutter blades; and the distance between a cutter blade and the top 20 of the mower deck is about 4 inches to provide an upper cavity of substantial volume which is advantageous in handling the great volume of material at the high cutting speeds. The conical bearing housings cooperate in providing an even upward draft to force the cut material out of the open side of the mower deck, as shown schematically in FIG. 5. This is considered an important advantage in processing the substantial quantities of cut material when the vehicle is operated at high speeds.

The pulley fastened to the shaft attached to the central cutting blade 27 is generally designated by reference numeral 40; and it includes three superposed pulley channels as seen in FIG. 1. The pulley attached to the shaft which drives the cutter blade 26 is designated 42 in FIG. 3.

A first belt 43 interconnects the pulley 42 with the lowermost channel of the pulley 40. A second belt 44 interconnects the pulley 31 with the intermediate channel of the central pulley 40; and a third belt 44a (see FIG. 1) interconnects the top channel of the pulley 40 with a pulley 45 fastened to the drive shaft 12a of the motor 12. The belt 44a makes a right-angle turn by means of two idler pulleys 47 and 48 which are journaled on either side of a horizontal shaft 49 which is received in a sleeve 50 extending vertically upward and fitting telescopically over a shaft 51 secured to the frame of the vehicle 10. The sleeve 50 is vertically adjustable along the shaft 51 by means of a pin 54 to compensate for stretching under normal wear, as with the adjustable mountings previously described to tighten belts 43 and 44. When the manual clutch which drives the shaft 12b is engaged, the drive belt 44a is turned by the drive shaft pulley 45, and each of the pulleys 31, 40 and 42 together with their associated cutter blades is driven so that all of the cutter blades rotate in the same direction, which preferably is in a direction so that the leading cutting edge of each blade moves toward the direction of travel and then around toward the opening 25 on the deck of the mower unit (i.e. clockwise when viewed from the top). This passes the cut material out the side opening on the mower deck and above the cutting blades in the direction of the arrows in FIG. 3.

A first side runner 55 is attached to the left side of the mower deck by means of a first bracket 56 attached to the inclined front plate 22 of the mower deck and a rear bracket 57 attached to the backplate of the mower deck. The runner 55 contains an upwardly and forwardly curving portion 58 so that any object which is encountered by it will tend to raise the mower deck. A second runner 59 is similarly attached to the other side of the mower deck (see FIG. 3).

On the rear plate 24 of the mower deck, there are provided first and second rollers, designated respectively by reference numerals 60 and 61, rotatably received on shafts journaled in mounting brackets 62. The runners 55 and 59 are designed to engage ground elevations to either side since the mower deck extends beyond the wheel base; and the rollers 60 and 61 engage ground elevations between the wheels to lift the mower deck.

Turning now to FIG. 2, the attachment of the cutter unit to the vehicle frame will now be explained in greater detail. As already mentioned, it is deemed highly desirable while operating at the high speed which the present invention is capable of achieving, to mount the mowing unit not only that it may be adjusted to a predetermined height above the ground (and capable of being lifted above that height) but also so that either of the side runners 55 or 59 engaging a ground elevation will lift its side of the mowing unit so that the entire cutter unit may be raised or tilted about the ground-engaging portion of the opposite runner. This permits a side-to-side inclination of the cutter blades relative to the horizontal but prevents a fore-to-aft inclination of the cutter blades relative to the horizontal.

Toward this end, first and second side scissors linkages, generally designated by reference numerals 65 and 66, interconnect the cutter unit with the sides of the vehicle.

As seen in FIG. 1, the left-side linkage 65 includes an outer link 68 pivotally connected to a bracket 69 attached to the front plate 22 of the mower deck and slidably received on a stud 70 secured to the side of the vehicle. The rear of the link 68 defines a slot 71 which is elongated in the direction of elongation of the link and which seats over the stud 70 so that as the cutter unit is raised and lowered, the slot 71 will slide along the stud 70. The scissors linkage 65 also includes an inner link 73, the forward end of which is pivotally connected at 74 to the vehicle 10.

The rear portion of the link 73 is provided with a slot 75 (similar to the slot 71 of the link 68) which is received on a stud 76 attached to a bracket 77 secured to the rear wall 24 of the mower deck. The links 68 and 73 are pivotally connected by means of a pin 80 to provide the opening and closing scissors action; thus, if there is an upward force transmitted to the link 68 by means of the forward bracket 69, a similar upward force will be transmitted to the rear portion of the mower deck through the link 73, the bracket 77 and the pin 76 to raise the entire left side of the mower deck in a horizontal line parallel to the direction of travel of the vehicle thus tilting it about the opposite runner.

The right side scissors linkage 66 is constructed similar to the scissors linkage 65 already described; and the two operate in a similar manner but on complementary sides of the mower deck.

The pilot of the mower unit is connected to the forward portion of the vehicle frame by means of a wishbone link 81 which is pivotally connected respectively at 82 and 83 to brackets 84 and 85 attached to the front plates 21 and 22 of the mower deck pilot. A neck portion 86 of the wishbone 81 is fitted through an aperture 87 in an angle bracket 88 which is secured to the forward cross bar of the vehicle frame as at 90 (see FIG. 1). The wishbone linkage described permits the raising and lowering of the mower unit relative to the vehicle frame while preventing any lateral displacement or rotation about a vertical axis thus stabilizing the same beneath the vehicle for all elevations.

For raising and lowering the mower unit beneath the vehicle, a transverse rod 92 is journaled in brackets 93 and 94 which are secured to the vehicle frame. Forwardly extending arms 95 and 96 are located toward either side of the transverse bar 92; and a lever 97 is attached to the left side of the transverse bar 92 and extends upwardly and slightly forward to a position adjacent the drivers seat 17 where an outwardly extending handle 98 is provided. On the side of the vehicle, there is located a plate 99 having a series of apertures 100 for receiving the pin 101 extending inwardly of the lever 97. Attached to the distal end of the arm 95 is a chain 104; and a similar chain 105 is attached to the distal end of the arm 96. The lower ends of the chains 104 and 105 are connected to the rear plate 24 of the mower deck at the locations 106 and 107 indicated in FIG. 3. When the lever 97 is rotated in the clockwise direction as viewed from the left side of the vehicle, the arms 95 and 94 which are secured to the transverse bar 92 also rotate counterclockwise thereby lifting the chains 104 and 105 which pull the mower unit upward. It will be apparent that through the use of the chains 104 and 105, the setting of the crank arm 97 determines a minimum height below which the cutter unit will not be lowered through gravity; and yet, should either of the side runners attached to the mower deck encounter a ground elevation at any cutter height, the respective runner will raise its side of the mower unit. It will also be apparent that any flexible linkage of sufficient strength, such as a wire cable, may be equally well used in place of the chains 104 and 105.

In order to offset the weight of the mower unit, a bell crank 110 (located approximately at the center of FIG. 1) having an upwardly projecting portion 111 and a horizontally and forwardly projecting portion 112 is pivotally mounted by means of a pin 113 in a bracket 114 secured to the vehicle frame. A spring 115 is connected under tension between the upper end of the upper portion 111 of the bell crank 110 and a fixed location on the vehicle 116. Thus, the spring 115 tends to rotate the bell crank 110 in a clockwise direction when viewed from the left side of the vehicle. However, the forward end of the section 112 of the bell crank 110 is attached to the center of the mower deck by means of a link 120 which is pivotally connected at one end to the forward portion 112 of the bell crank 110 and pivotally connected at its lower portion to a bracket 121 which is attached to the top plate 120 of the mower deck. The force tending to rotate the bell crank 110 in a clockwise direction caused by the tension of the spring 115 is less than the weight of the mower deck so that the latter will lower under force of gravity to the proper cutting height. However, the net weight of the mower unit is substantially less than its actual weight so that it will react quickly when an obstruction is encountered. Further, this counterbalancing system permits the easy vertical adjustment of the cutter unit by means of the hand-actuatable lever 97.

It will be appreciated that other systems including power-actuated mechanisms may be employed to raise the cutter unit in place of the hand-actuated system shown. For example, an electric motor mounted on the vehicle frame may be coupled to the mower deck by means of a rigid shaft journaled in a ball bushing which permits retraction and extension of the shaft to raise and lower the cutter unit. Other equivalent mechanism include hydraulic and pneumatic power devices.

Referring again to FIG. 2, the entire cutter unit may be detached from the traction vehicle by removing the side bolts securing the upper portions of the scissors linkages 65 and 66 to the vehicle and removing the pivotal connection of the link 120 with the forward section 112 of the bell crank 110. The chains 104 and 105 also must be removed from the arms 95 and 96 of the crossbar 92 to drop the cutter unit onto its runners 55 and 59. A slight rearward movement of the cutter unit will then remove the neck 86 of the wishbone link 81 from its bracket 88.

Turning again to FIG. 5, there is illustrated a very important operating and safety feature of inventive machine wherein the rotating blades striking a heavier object will propel it toward the inclined front or rear wall of the cutter deck. The inclination of the walls (preferably about 30°) will force the heavier objects directly downward while separating the lighter cut material which is sucked by the propeller blades upwardly into the chamber above the blades and thence forced out the discharge chute. In particular I have noticed that if a blade strikes glass or a bottle, it will shatter upon impact but will be deflected immediately downward when it strikes the inclined walls of the housing.

Having thus described in detail a preferred embodiment of the inventive traction vehicle, mowing unit and its associated suspension system, it will be appreciated that the combination is advantageously designed for high speed operation with a vehicle having a low center of gravity and wide wheel base for high maneuverability. The cutting unit may be lowered by a hand-actuated lever to any desired height above a certain minimum height of the cutting blades as defined by the ground-engaging runners attached to the sides of the mower deck. The suspension system permits raising of either side of the suspended mowing unit while maintaining the opposite side at its predetermined height; and this is done with the raised side maintaining its parallel relation to the ground. The side scissors linkages together with the flexible links attached to the mower deck advantageously accomplish this result; and they cooperate with the front wishbone link to stabilize the mower deck in yaw.

The main power is coupled to the cutter shafts by means of a flexible belt which permits raising and lowering of the mowing unit without the need for adjusting the driving mechanism. The counterbalancing mechanism permits fast reaction of the mower deck to an encountered elevation or obstruction and further eases the burden on raising and lowering the mower unit by means of the hand-operated lever. Further, the inclination of the pilot and rear sections of the mower housing permits the separation of solid debris from the cut material by deflecting the solid material directly to the ground whereas the updraft created by the rotating propeller-type blades lifts the cut material to an enlarged cavity defined between the rotating blades and the top plate of the mower deck, and thence out the side opening to substantially increase the ability of the cutter unit to process cut materials.

Persons skilled in the art will be able to devise other structures and mechanisms capable of accomplishing certain of the functions and results of the individual elements of the described combination without departing from the inventive principle; and it is, therefore, intended that such modifications and equivalents be covered as they are embraced within the spirit and scope of the appended claims.

1. In combination, a four-wheel traction vehicle having an engine for powering said vehicle and characterized by having a relatively low center of gravity and wide wheel base; a rotary mowing unit having a covering deck and a plurality of cutting blades mounted to said deck for rotation about a vertical axis and located beneath said deck; adjustable suspension means for supporting said deck beneath said vehicle at a predetermined but adjustable height above the ground, said suspension means permitting said mowing unit to be raised when the same encounters a ground obstacle while preventing said unit from being lowered below said predetermined height and including flexible link means interconnecting said mower deck and said vehicle for supporting said mowing unit; lift means carried by said vehicle and coupled to said flexible link means for raising and lowering said mowing unit to said predetermined height; drive means including a belt drive system for coupling power from said engine to drive said blades; first and second side linkage means separately interconnecting said deck with said vehicle for maintaining said deck in parallel relation with a line extending in the direction of travel of said vehicle while permitting said mowing unit to be tilted about said line whereby one side of said mowing unit may be raised in parallel relation and independent of the other side; a wishbone linkage having a neck pivotally connected with the vehicle frame and first and second base portions pivotally interconnecting with the deck of said mowing unit whereby said mowing unit may be raised and lowered relative to said vehicle while stabilized against rotation about a vertical axis; and counterbalancing link mechanism interconnecting said deck of said mowing unit with said vehicle for partially offsetting the weight of said mowing unit.

2. The apparatus of claim 1 wherein said first and second side linkage means each comprise a scissors linkage including first and second links pivotally interconnected with each other intermediate their ends, a first end of said first and second links being pivotally connected respectively with said mower deck and said vehicle, the other ends of said first and second links defining slots for receiving first and second pins connected respectively to said vehicle and said mower deck spaced apart from said first and second pivotal connections whereby said slots will ride along their associated pins when said mowing unit is raised and lowered relative to said vehicle while maintaining each side of said unit parallel to a horizontal line in the direction of travel of said vehicle.

3. The apparatus of claim 1 wherein said mowing unit deck defines an open side for the passage of cut materials and wherein said cutter blades are horizontally mounted at least about 4 inches beneath the top of said deck thereby to provide an enlarged upper cavity between said blades and said deck and communicating with said side opening for passing substantial amounts of cut material above said blades and out said side opening when said combination is cutting at high speeds, said rotary blades arranged in said mower deck including first and second side blades and a forwardly disposed center blade, the swaths of said blades overlapping in the direction of movement of said vehicle, said blades defining an upward draft for moving cut materials thereabove and into said enlarged cavity.

4. The apparatus of claim 3 wherein the forward end of said mower deck includes first and second, forwardly and downwardly projecting plates extending from the top of said deck and inclined relative to each other to define a pilot for said mowing unit, and a rearwardly and downwardly projecting rear plate, whereby heavy objects struck by said rotating blades and deflected by said pilot or rear plate of said deck will be directed downwardly and the cut material directed upwardly of said blades and exhausted through said side opening.

5. The apparatus of claim 4 further comprising first and second ground-engaging runners attached to the sides of said mower deck respectively and disposed beneath the same to define a minimum height for the cutter blades when said runners slide along the ground.

6. The apparatus of claim 5 further comprising rear roller means pivotally attached centrally of said rear plate of said mower deck and extending beneath the same for engaging ground elevations occuring in the center of said mower deck.

7. In combination, a traction vehicle having a frame and a pair of front wheels and a pair of rear wheels; a cutter unit including a deck beneath said vehicle and between said front and rear wheels; scissors linkage mechanism interconnecting each side of said deck with said vehicle frame for permitting raising of either side of said cutter unit independently of the other while preventing tilt of said cutter unit in a fore-and-aft direction, link means interconnecting said cutter deck and said frame for permitting raising and lowering of said deck while preventing rotation thereof relative to said frame about a vertical axis; adjustable flexible link means interconnecting said cutter deck with said frame for supporting the same and setting the minimum height of the cutter unit above the ground while permitting raising of the same; spring means interconnecting said frame with said mower deck for resiliently urging said deck in an upward direction to at least partially offset the weight of said mower unit; said cutter unit further including a plurality of rotatable cutter blades mounted for rotation about the vertical axes and wherein each of said rotatable cutter mountings include a first plate above said cutter deck top plate, a second plate above said cutter deck top plate, a first bearing in said second plate, an inverted conical-shaped housing secured beneath said second plate and extending downwardly therefrom, a second bearing located at the bottom of said conical housing, a shaft attached to one of said blades and extending vertically through said first and second bearing plates and rotatably received therein and defining a portion extending above said first plate, and a pulley mounted to said shaft above said first plate and said top plate of said cutter deck.

8. The combination of claim 7 wherein each of said first and second plates for said side cutter mountings define slots extending in the direction of travel of said vehicle and said deck defines a slot for receiving said cutter shaft whereby said sitter units may be moved to tighten their associated drive belts as they stretch with wear.